(12) United States Patent
Lin et al.

(10) Patent No.: US 11,804,217 B2
(45) Date of Patent: Oct. 31, 2023

(54) METHOD AND APPARATUS FOR CORRECTING VOICE DIALOGUE

(71) Applicant: AI Speech Co., Ltd., Jiangsu (CN)

(72) Inventors: Yongkai Lin, Jiangsu (CN); Shuai Fan, Jiangsu (CN)

(73) Assignee: AI Speech Co., Ltd., Jiangsu (CN)

( * ) Notice: Subject to any disclaimer, the term of this patent is extended or adjusted under 35 U.S.C. 154(b) by 0 days.

(21) Appl. No.: 17/996,643

(22) PCT Filed: Nov. 17, 2020

(86) PCT No.: PCT/CN2020/129337
§ 371 (c)(1),
(2) Date: Oct. 20, 2022

(87) PCT Pub. No.: WO2021/212817
PCT Pub. Date: Oct. 28, 2021

(65) Prior Publication Data
US 2023/0223015 A1    Jul. 13, 2023

(30) Foreign Application Priority Data
Apr. 20, 2020   (CN) .......................... 202010311357.7

(51) Int. Cl.
*G10L 15/22* (2006.01)
*G10L 15/18* (2013.01)

(52) U.S. Cl.
CPC .......... *G10L 15/1815* (2013.01); *G10L 15/22* (2013.01); *G10L 2015/223* (2013.01); *G10L 2015/225* (2013.01)

(58) Field of Classification Search
CPC ................ G10L 15/1815; G10L 15/22; G10L 2015/223; G10L 2015/225
See application file for complete search history.

(56) References Cited

U.S. PATENT DOCUMENTS

| | | | | |
|---|---|---|---|---|
| 2011/0307241 | A1* | 12/2011 | Waibel | G06F 40/44 704/2 |
| 2016/0379513 | A1 | 12/2016 | DuQuette et al. | |
| 2020/0184959 | A1* | 6/2020 | Yasa | G06F 40/30 |

FOREIGN PATENT DOCUMENTS

| | | |
|---|---|---|
| CN | 107093423 A | 8/2017 |
| CN | 108091328 A | 5/2018 |

(Continued)

*Primary Examiner* — Abul K Azad
(74) *Attorney, Agent, or Firm* — Edwin A. Sisson, Attorney at Law, LLC; John W. Bain; Jeffrey J. Banyas (57) ABSTRACT

Disclosed are method and apparatus for correcting voice dialogue, including: recognizing first text information of a dialogue speech input by a user, including a first semantic keyword determined from a plurality of candidate terms; feeding back a first result with the first semantic keyword to the user based on the first text information; feeding back the plurality of candidate terms to the user in response to the user's selection of the first semantic keyword from the first result; and receiving a second semantic keyword input by the user, correcting the first text information based on the second semantic keyword, determining corrected second text information, and feeding back a second result with the second semantic keyword to the user based on the second text information. The problem of true ambiguity can be solved, while improving the fault tolerance and processing capability of the dialogue apparatus for corresponding errors.

8 Claims, 2 Drawing Sheets

(56) References Cited

FOREIGN PATENT DOCUMENTS

| CN | 108121455 A | 6/2018 |
| CN | 109215661 A | 1/2019 |
| CN | 111540356 A | 8/2020 |

* cited by examiner

METHOD AND APPARATUS FOR CORRECTING VOICE DIALOGUE

PRIORITIES AND CROSS REFERENCES

This Application claims priority from International Application No. PCT/CN2020/129337 filed on Nov. 17, 2020 and Chinese Application No. 202010311357.7 filed on Apr. 20, 2020, the teachings of each of which are incorporated by reference herein in their entirety.

TECHNICAL FIELD

The present invention relates to the field of intelligent speech, in particular to a method and apparatus for making correction in a voice dialogue.

BACKGROUND

With the development of intelligent speech service, communications between users and smart devices become more convenient. The smart devices conduct semantic interpretation and recognition of speeches input by the users to obtain the users' intention, and then feed back corresponding operation to the users. If erroneous recognition occurs, the users can generally make corrections thereof. For example:

User speech recognition result: 打电话给林永凯 (Call LIN, Yong-kai (林永凯)).

Chatbot reply 为你找到林永凯的电话，是否拨打 (Find LIN, Yong-kai (林永 凯)'s phone number for you, call or not).

User speech recognition result: 是楷模的楷 (Kai is "楷" as in "楷模 (model)").

Chatbot reply: 为你找到林永楷的电话，是否拨打 (Find LIN, Yong-kai (林永 楷)'s phone number for you, call or not).

In another example:

User speech recognition results: 导航去精 (jing) 英 (ying) 公 (gong) 寓 (yu) (Navigate to Elite Apartment (jing(精)-ying-gong-yu)).

Chatbot reply: 抱歉没有找到精 (jing) 英 (ying) 公 (gong) 寓 (yu) (Sorry, no Elite Apartment is found).

User speech recognition result: 是草字头的菁英 (it is jing-ying (菁英, Elitist) where 菁 has a ⁺⁺ head).

Chatbot reply: 即将为您导航到菁 (jing) 英 (ying) 公 (gong) 寓 (yu) (Will navigate to Elitist Apartment (jing(菁)-ying-gong-yu) for you).

In still another example:

User speech recognition result: 我要去西 (xi) 藏 (zang) (I am going to Tibet (西藏 pronounced as Xi-zang)).

Chatbot reply: 即将为您导航到西藏 (Will navigate to Tibet for you soon).

User speech recognition result: 是站 (zhan) 台的站 (I mean zhan (站) as in 站台 (zhan-tai, station)).

Chatbot reply: 好的，即将为您导航到西站 (Okay, will navigate you to xi-zhan (西站 the West Railway Station) soon).

In the process of realizing the present invention, the inventors found that at least the following problems exist in the related art.

In the process of actively correcting the statement in the previous round or previous rounds of dialogue through speech, it is generally necessary to clearly describe the wrong character and the character that needs to be corrected. When the speech is long or the speech is repeated, it may be difficult for the user to make a clear expression. For example:

"我想买一张从北 (bei) 京 (jing) 西 (xi) 站 (zhang) 去西 (xi) 藏 (zang) 的票 (I want to buy a ticket from Beijing West Railway Station (Bei-jing-xi-zhan) to Tibet (Xi-zang))". If a recognition error occurs, it may become "我想买一张从北 (bei) 京 (jing) 新 (xing) 站 (zhan) 去西 (xi) 站 (zhan) 的票 (I want to buy a ticket from Beijing New Railway Station (Bei-jing-xin-zhan) to the West Railway Station (xi-zhan))". When the user wants to make correction, he/she needs to say "不是北京新站是北京西站，而且也不是西站是西藏自治区的西藏 (not Beijing New Railway Station (Bei-jing-xin-zhan) but Beijing West Railway Station (Bei-jing-xi-zhan), and not the New Station (xin-zhan) but Tibet (Xi-zang) of the Tibet Autonomous Region)." On one hand, the statement is relatively complex, and on the other hand, it may not be able to correct the recognition errors come with correcting the statement itself. The statement corrected as in the above sentence may still be recognized erroneously as "不是北京新站是北京西站，而且也不是新站是西藏自治区的西藏 (not Beijing New Railway Station (Bei-jing-xin-zhan) but Beijing West Railway Station (Bei-jing-xi-zhan), and not the New Station (xin-zhan) but Tibet (xi-zang) of the Tibet Autonomous Region)".

Alternatively, because of the language model, even if the user repeats "xi-er-qi" several times again and again in the dialogue, it will still be recognized as "西二奇" instead of "西一旗", both have the same pronunciation "xi-er-qi".

That is, due to the limitation of the misrecognition made by speech recognition itself, the recognition result of statement during correction is still wrong.

When performing speech correction, although the user's pronunciation is correct, if the term the user wants to input is still not the one with the highest confidence, it will still be recognized as other terms.

When the content to be recognized is relatively long, a plurality of terms with similar pronunciation are likely to appear, or when the pronunciations of the content recognized by a plurality of semantic slots are relatively close, it will be difficult to accurately determine the position of the term that needs to be corrected.

SUMMARY OF THE INVENTION

The present invention at least solves the problem in the prior art that when recognition error occurs or other term is recognized due to the language model, it is difficult to determine the position of the term that needs to be corrected in a long sentence or a sentence with similar pronunciation.

In a first aspect, an embodiment of the present invention provides a method for correcting a voice dialogue, including:

recognizing first text information of a dialogue speech input by a user, the first text information including a first semantic keyword determined from a plurality of candidate terms;

feeding back a first result with the first semantic keyword to the user based on the first text information;

feeding back the plurality of candidate terms to the user in response to the user's selection of the first semantic keyword within the first result; and receiving a second semantic keyword input by the user, correcting the first text information based on the second semantic keyword, determining corrected second text information, and feeding back a second result with the second semantic keyword to the user based on the second text information.

In a second aspect, an embodiment of the present invention provides an apparatus for correcting a voice dialogue, including:

a speech recognition program module configured to recognize first text information of a dialogue speech input by a user, the first text information including a first semantic keyword determined from a plurality of candidate terms;

a result feedback program module configured to feed back a first result with the first semantic keyword to the user based on the first text information;

a candidate term feedback program module configured to feed back the plurality of candidate terms to the user in response to the user's selection of the first semantic keyword from the first result,;

a correction program module configured to receive a second semantic keyword input by the user, correct the first text information based on the second semantic keyword, determine corrected second text information, and feed back a second result with the second semantic keyword to the user based on the second text information.

In a third aspect, an electronic device is provided, including: at least one processor, and a memory communicatively connected to the at least one processor, wherein the memory stores instructions executable by the at least one processor, and the instructions are executed by the at least one processor, such that at least one processor can execute the steps of the method for correcting a voice dialogue according to any embodiment of the present invention.

In a fourth aspect, an embodiment of the present invention provides a storage medium having a computer program stored therein, wherein the program, when being executed by a processor, implement the steps of the method for correcting a voice dialogue according to any embodiment of the present invention.

The embodiments of the present invention have the following beneficial effects. The introduction of the active error correction function of the disclosed method into the dialogue system can improve the practicability of the dialogue system and solve the true ambiguity problem objectively exists (which also exists in human-to-human dialogue). At the same time, the tolerance and processing capabilities of the dialogue system for corresponding errors are also improved, which helps the dialogue system to provide users with a better experience of using intelligent speech products, especially devices with a screen.

The problem of erroneous recognition is always inevitable in a speech recognition input method, especially in an intelligent terminal. The current mainstream products in the market fail to provide a design with a good user experience for error correction. The user can only use the cursor to locate a specific position and manually delete the related content, and then use text input method to input correct text. It is foreseeable that after the speech input method introduces multi-modality-based active error correction, it is possible to directly click or select terms based on the context during error correction, and then select corresponding correct terms from the candidate terms with high confidence fed back by the system, which can avoid the need to use a keyboard for modification during each error correction, greatly improving the performance bottleneck and user experience of the speech input method.

BRIEF DESCRIPTION OF THE DRAWINGS

In order to illustrate the technical solutions of the embodiments of the present disclosure more clearly, a brief description of the accompanying drawings used in the description of the embodiments will be given as follows. Obviously, the accompanying drawings are some embodiments of the present disclosure, and those skilled in the art can also obtain other drawings based on these drawings without any creative effort.

DETAILED DESCRIPTION OF THE EMBODIMENTS

In order to further clarify the objectives, technical solutions and advantages of the embodiments of the present disclosure, the technical solutions in the embodiments of the present disclosure will be described clearly and completely below with reference to the accompanying drawings in the embodiments of the present disclosure. Obviously, only some but not all embodiments of the present disclosure have been described. All other embodiments obtained by those skilled in the art based on these embodiments without creative efforts shall fall within the protection scope of the present disclosure.

An embodiment of the present invention provides a method for correcting a voice dialogue, which is applied to an electronic device. The electronic device may be a smart TV, a smart phone, a smart speaker, a smart on-board device, a smart screen, etc., which is not limited in the present invention.

Figure 1:
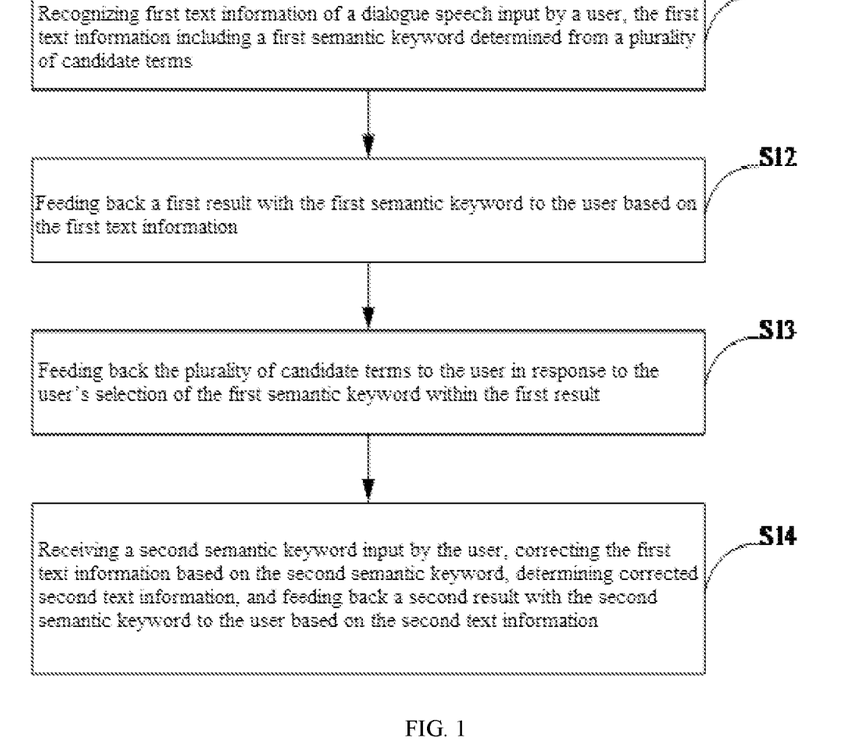
FIG. 1 is a flowchart of a method for correcting a voice dialogue according to an embodiment of the present invention.

FIG. 1 is a flowchart of a method for correcting a voice dialogue according to an embodiment of the present invention. The method is applied to an electronic device and includes the following steps.

In S11, the electronic device recognizes first text information of a dialogue speech input by a user, including a first semantic keyword determined from a plurality of candidate words.

In S12, the electronic device feeds back a first result with the first semantic keyword to the user based on the first text information.

In S13, the electronic device feeds back the plurality of candidate words to the user in response to the user's selection of the first semantic keyword within the first result.

In S14, the electronic device receives a second semantic keyword input by the user, corrects the first text information based on the second semantic keyword, determines corrected second text information, and feeds back a second result together with the second semantic keyword to the user based on the second text information.

In this embodiment, during the development of a dialogue system, engineers are mostly faced with a single round of dialogue. In a single round of dialogue, it is normally apt for a recognition result and a semantic parsing result with the highest confidence to be output. Since true ambiguity is less frequent than false ambiguity, engineers will consider how to automatically resolve false ambiguity when ambiguity occurs. In the process of actually using the dialogue system, the situation of "true ambiguity" is often unable to be handled by automatic disambiguation strategies.

For example, in the case of user's speech "播放西游记 (Play Journey to the West)", if it may be either a film or a radio program, the system often fails to respond correctly to the user's needs.

As another example, in the case of user's speech "我想看怦 (peng) 然 (ran) 星 (xing) 动 (dong) (I want to watch peng-ran-xing-dong (Fall In Love Like A Star, the movie directed by CHEN, Guohui in 2015))" and "我想看怦 (peng) 然 (ran) 心 (xin) 动 (dong) (I want to watch peng-ran-xin-dong (Flipped, the movie directed by Rob Reiner in 2010))", the two pronunciations are very similar, which may render incorrect recognition regardless of which movie is the result of speech recognition.

For the development of the voice dialogue system, a generally direct method is to correct the typos of the previous round through the next round of interaction, which has the defects pointed out in the background section. In addition, due to various subjective or objective factors, such as the insufficient development level of artificial intelligence technology, few engineers will pay attention to true ambiguity and the function of error correction, and therefore it is not easy to think of using multi-modality for correction, which is contrarily used by the method according to the present invention.

For step S11, in order to be able to recognize the user's dialogue speech, a recognized audio is generally converted into text by a microphone array, or text is directly input using a keyboard in the first round of the multi-modal dialogue system, considering the need to support multi-modality.

The microphone array is composed of a certain number of microphones, which are used to record speech audio signals. By means of a signal processing algorithm, the microphone array can identify the direction of the sound source and remove the background sound to a certain extent, improving the accuracy of automatic speech recognition.

By capturing an audio stream with the microphone array and uploading the same to the cloud over network for an automatic speech recognition service to obtain text information corresponding to the speech, the automatic speech recognition service can also improve the accuracy of text recognition based on an acoustic model and a language model in the home environment. The recognized text will be sent directly to a semantic parsing module in the cloud to parse a sentence of text into semantic entities.

For example, in the case that the user inputs a speech "我想看怦然心动 (I want to watch peng-ran-xin-dong (Flipped))", during speech recognition, there are a plurality of candidate words for each word to adjust the sentence. For example, in the speech of "怦 (peng) 然 (ran) 心 (xin) 动 (dong) (Flipped)", two terms "怦 (peng) 然 (ran) 心 (xin) 动 (dong) (Flipped)" and "怦 (Peng) 然 (ran) 星 (xing) 动 (dong) (Fall In Love Like A Star)" will be recognized due to the user's pronunciation problem or language model, both of which happen to be in a movie semantic slot. Generally speaking, the system will select a candidate term with a higher confidence as the keyword of the sentence, which results in that the recognition result is "我想看怦 (peng) 然 (ran) 星 (xing) 动 (dong) (I want to watch Fall In Love Like A Star)" while the speech input by the user is "我想看怦 (peng) 然 (ran) 心 (xin) 动 (dong) (I want to watch Flipped)".

For step S12, feedback is provided to the user through "我想看怦 (peng) 然 (ran) 星 (xing) 动 (dong) (I want to watch Fall In Love Like A Star)" determined by the identification in step S11, such as "为你找到以下符合怦 (peng) 然 (ran) 星 (xing) 动 (dong) 的内容，请问你要看哪一部 (Find the following content for you that matches Fall In Love Like A Star, which one do you want to watch)".

For step S13, due to the use of multi-modality, the user can select "怦 (Peng) 然 (ran) 星 (xing) 动 (dong) (Fall In Love Like A Star)" in the speech recognition result with a mouse or a touch screen. If the user uses a click operation to make a selection, he/she only needs to click any character in "怦 (Peng) 然 (ran) 星 (xing) 动 (dong) (Fall In Love Like A Star)". If the selection operation is performed in the form of click-and-drag, no matter whether the user selects "星 (xing, namely "star")" or "星 (xing) dong (动)" or "怦 (Peng) 然 (ran) 星 (xing) 动 (dong) (Fall In Love Like A Star)", the selection can be realized. In the above selection process, selection operations include, but are not limited to, click, click-and-drag, and draw a circle.

After the user selects "怦 (Peng) 然 (ran) 星 (xing) 动 (dong) (Fall In Love Like A Star)", a plurality of candidate terms ("怦 (Peng) 怦 (ran) 星 (xing) 动 (dong) (Fall In Love Like A Star)" and "怦 (Peng) 然 (ran) 心 (xin) 动 (dong) (Flipped)") determined during recognition are fed back to the user.

As an implementation, the first semantic keyword determined from the plurality of candidate terms includes:

selecting a candidate term with the highest recognition confidence from the plurality of candidate terms and determining the same as the first semantic keyword; and feeding back the plurality of candidate terms to the user includes:

ranking the plurality of candidate terms by recognition confidence, and feeding back a list window of the plurality of candidate terms to the user.

In this embodiment, for example, what communicates with the user is a smart device with a graphical interface. During the dialogue, a list of candidate terms is automatically popped up on the graphical interface control:

1. 怦 (Peng)然 (ran)星 (xing)动 (dong) (Fall In Love Like A Star)

2. 怦 (Peng)然 (ran)心 (xin)动 (dong) (Flipped)

3. Peng (怦 ) ran (然 ) xing (行 ) dong (动 ) (Peng-ran action)

4. 烹 (Peng) 饪 (ren) 行 (xing) 动 (dong) (Cooking action)

5. . . . .

or a list in grid form:

| 1.怦(Peng)然 (ran)星 (xing)动 (dong) | 2.怦(Peng)然 (ran)心 (xin)动 (dong) |
|---|---|
| 3. Peng(怦 )ran(然 )xing(行 )dong(动 ) (dong) 5. ... | 4.烹 (Peng) 饪 (ren)行 (xing)动 6. ... |

In practical use, the design of the candidate term window includes but is not limited to forms such as list and grid.

Figure 2:
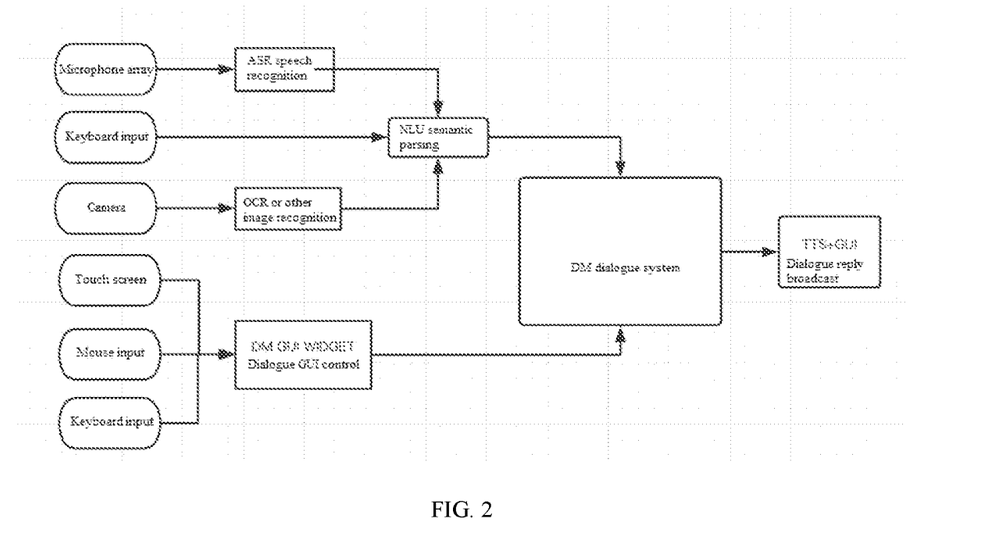
FIG. 2 is a software implementation flowchart of a method for correcting a voice dialogue according to an embodiment of the present invention.

In step S14, the user clicks and selects "怦 (Peng) 然 (ran) 心 (xin) 动 (dong) (Flipped)" from the candidate list. After correction, the smart device outputs "重新为你找到 以下符合怦然心动的内容，请问你要看哪一部 (Find the following content for you that meets 怦 (Peng) 然 (ran) 心 (xin) 动 (dong) (Flipped), which one do you want to watch?)". Then a normal voice dialogue flow proceeds: User: 第一个 (the first one); Smart device: 为你播放 罗伯·莱纳导演的怦然心动 (Play Flipped directed by Rob Reiner for you). The specific process is shown in FIG. 2.

It can be seen from this embodiment that the introduction of the active error correction function of the method into the dialogue system can improve the practicability of the dialogue system and solve the true ambiguity problem objectively exists (also exists in human-to-human dialogue). At the same time, the tolerance and processing capabilities of the dialogue system for corresponding errors are also improved, which helps the dialogue system to provide users with a better experience in using intelligent speech products, especially devices with a screen.

In a speech recognition input method, especially in an intelligent terminal, the problem of erroneous recognition is always inevitable. The current mainstream products in the market fail to provide a design with a good user experience for error correction. The user can only use the cursor to locate a specific position and manually delete the related content, and then use a text input method to input correct text. It is foreseeable that after the speech input method introduces multi-modality-based active error correction, it is possible to directly click or select terms based on the context during error correction, and then select corresponding correct terms from the candidate terms with high confidence fed back by the system, which can avoid the need to use a keyboard for modification during each error correction, greatly improving the performance bottleneck and user experience of the speech input method.

As an implementation, in this embodiment, said receiving the second semantic keyword input by the user includes:
- when the user selects a term from the plurality of candidate terms, determining the selected term as a second semantic keyword;
- when the user inputs a corrected dialogue speech, recognizing the corrected dialogue speech, and determining the second semantic keyword according to the recognition result; and
- when the user inputs corrected text, determining the second semantic keyword according to the corrected text.

In this embodiment, when the user inputs a speech for the first time: "我想看怦然 心动 (I want to watch Flipped)". Since "怦然星动 (Fall In Love Like A Star)" has a higher search interest, the system returns "怦然星动 (Fall In Love Like A Star)" directed by CHEN, Guohui in 2015. But what the user actually wants to watch is the film "怦然心动 (Flipped)" directed by Rob Reiner in 2010. After the user found the recognition error, he/she clicked "怦然心动 (Flipped)" in the speech recognition result on the dialogue GUI control. Similarly, the user can also click "怦然心动 (Flipped)" in the reply of the dialogue system to correct the error. Since "怦然星动 (Fall In Love Like A Star)" belongs to a semantic slot parsing result, the dialogue GUI control only needs to display the candidate results returned by the current round of dialogue to the screen in the form of a list or network. If in this round of dialogue, the content the user wants to correct is not a complete semantic slot, or no semantic parsing result exists due to a typo, the dialogue system may not return a candidate result for the term corresponding to the typo. When selected by the user, the dialogue GUI control will request the dialogue system to dynamically obtain the corresponding candidate terms.

For extreme cases, such as some newly appeared web terms or new web movies, the candidate list may not contain the results that the user wants. In this case, the user can choose one of the following methods.

Method 1: he/she corrects the current round of speech recognition result directly through keyboard or virtual keyboard input.

Method 2: Since the user has selected the typo in this case, he/she can directly say "心 (xin, namely heart) 情 (qing) 的心 (xin)", i.e., "心 (xin) as in 心情 (xin-qing, namely mood))", or the correct content directly through speech. For example, when the number 136 is indistinguishable due to sudden environmental noise rather than pronunciation and 136 is recognized as 133, the user only needs to select 133 and then say 136 directly (this method of typo error correction is an operation which has already made a selection, and therefore, the situation that it is not possible to determine which character is to be corrected will not occur if the recognition content is very long, or contains a plurality of characters with similar pronunciation (such as xing and xin).

It can be seen from this embodiment that a variety of ways are provided for the user to input corrected information, so as to ensure accuracy and improve user experience.

As an implementation, in this embodiment, said receiving the second semantic keyword input by the user further includes:
- when the user inputs image information, recognizing corrected text in the image information, and determining the second semantic keyword according to the corrected text.

In this embodiment, for an environment unfriendly to keyboard operation, such as TVs, smart screens, or a user that is not familiar with keyboards, a camera can be used to cooperate with gestures to point out the text content. For example:

User: 我想再买一盒瑞 (rui) 士 (shi) 莲 (lian) 巧克力 (I want to buy another box of Lindt chocolates). Here, 瑞 (rui) 士 (shi) 莲 (lian) is a brand name in Chinese corresponds to Lindt).

System: 为你找到以下瑞 (rui) 氏 (shi) 莲 (lian) 巧克力，请问你要买哪一个？(Find the following Wright's chocolates for you, which one do you want to buy?). Here, 瑞 (rui) 氏 (shi) 莲 (lian) is another brand name in Chinese).

User: The user took out the chocolate box at hand, pointed to the 瑞 (rui) 士 (shi) 莲 (lian) text on the box, and said "不是这三个字，我想要的是这三个字 (not those three characters, I want these three characters)".

System: The system combines the results of speech recognition and text recognition and returns after comprehensive processing: 为你找到以下端 (rui) 士 (shi) 莲 (lian) 巧克力，请问你要买哪一个？(Find the following Lindt chocolates for you, which one do you want to buy?)

It can be seen from this embodiment that an image method is provided for the user to input corrected information, further improving user experience.

As an implementation, in this embodiment, the method further includes: recording a plurality of rounds of results, each round of result being fed back to the user with semantic keywords; and in response to the user's selection of a semantic keyword within any round of result, feeding back a plurality of candidate terms corresponding to the semantic keyword to the user.

In this embodiment, the user is in constant communication with the smart device, and the smart device records the conversation record with the user through the screen. For example:

User: 我想看怦 (Peng) 然 (ran) 星 (xing) 动 (dong) (I want to watch Fall In Love Like A Star).

System: 为你找到以下符合怦 (Peng) 然 (ran) 星 (xing) 动 (dong) 的内容，请问你 要看哪一部 (Find the following content for you that matches Fall In Love Like A Star, which one do you want to watch).

User: 怦 (Peng) 然 (ran) 心 (xin) 动 (dong) (Flipped).

System: 为你找到以下符合怦 (Peng) 然 (ran) 心 (xin) 动 (dong) 的内容，请问你要 看哪一部 (Find the following content that meets 怦 (Peng) 然 (ran) 心 (xin) 动 (dong) (Flipped), which one do you want to watch?).

In this case, the user can make a selection in any of the above rounds of conversations, and can select the latest dialogue "为你找到以下符合怦然心动的内容，请问你要看哪一部 (Find the following contents that meets 怦 (Peng) 然 (ran) 心 (xin) 动 (dong) (Flipped), which one do you want to watch?)". And meanwhile, the previous three rounds of dialogues can also be selected to correct errors in historical conversations for the user, further improving user experience.

As an implementation, in this embodiment, said feeding back the first result with the first semantic keyword to the user based on the first text information includes:

determining a corresponding first skill based on the first text information, and when the first text information hits a plurality of candidate skills, selecting a skill with the highest preset priority and determining the same as the first skill;

feeding back the first result with text involving the first skill to the user through the first skill;

feeding back the plurality of candidate skills to the user in response to the user's selection of the text involving the first skill within the first result;

when the user's input contains a voice dialogue involving a second skill, re-determining the second skill according to the first text information, and feeding back a second result with text involving the second skill to the user through the second skill; or when the user's input contains a negative-tone dialogue involving the first skill, re-determining a corresponding third skill according to the first text information, and feeding back a third result with text involving the third skill to the user through the third skill.

In this embodiment, semantic analysis errors are corrected. For example:

User: 播放西游记 (Play Journey to the West).

System: 为你找到以下西游记的视频 (Find the following video of Journey to the West for you).

①User: 我想听的是有声书 (I want to listen to an audiobook).

System: 为你播放有声书西游记 (Play the audiobook Journey to the West for you).

②User: 我不要看视频 (I don't want to watch the video).

System: 为你播放有声书西游记 (Play the audiobook Journey to the West for you).

As mentioned above, when the user directly says "播放西游记 (Play Journey to the West)", a skill [影视 (Video)] with the highest confidence will be provided after semantic parsing. Although an [有声书 (Audiobook)] skill also has a high confidence, this result may not be displayed. Therefore, the user can conduct secondary interactions in the form of active corrections when the results do not meet expectations.

As described below, when the user is not satisfied with the semantic parsing result, it can be corrected directly by correcting the content of the semantic slot in the dialogue result:

User: 播放西游记 (Play Journey to the West).

System: 为你找到以下西游记的视频 (Find the following video of Journey to the West for you).

The user selects the term "视频 (video)" in the prompt returned by the dialogue system.

The dialogue GUI control of the System automatically pops up the candidate term window, which displays other skills that can be used 1. 有声书 (Audiobooks)
2. 少儿动画 (Children's animation)
3. 音乐 (Music)
4. 儿歌精选 (Selected Children's Songs)
5. 百科 (Encyclopedia)

The user selects 有声书 (Audiobooks) by clicking.

System: 为你播放有声书西游记 (Play the audiobook Journey to the West for you).

Although the examples in the above embodiments merely involve correcting Chinese characters, the above method can also be applied to correct speech recognition errors and semantic parsing results in other languages.

It can be seen from this embodiment that the provided error correction function can not only deal with true ambiguity in the dialogue, but also deal with semantic parsing errors, which improves the dialogue systems ability to deal with errors.

Figure 3:
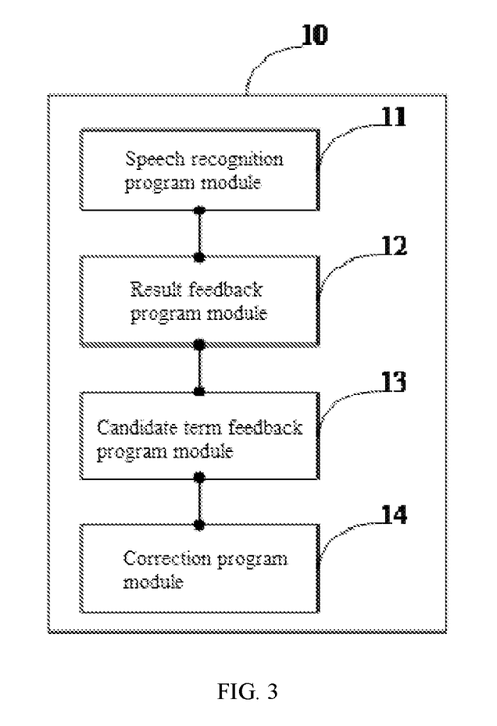
FIG. 3 is a schematic structural diagram of an apparatus for correcting a voice dialogue according to an embodiment of the present invention.

FIG. 3 is a schematic structural diagram of an apparatus for correcting a voice dialogue according to an embodiment of the present invention. The apparatus can execute the method for correcting a voice dialogue according to any of the above embodiments, and is configured in a terminal.

The apparatus for correcting a voice dialogue according to this embodiment includes a speech recognition program module 11, a result feedback program module 12, a candidate term feedback program module 13 and a correction program module 14.

The speech recognition program module 11 is configured to recognize first text information of a dialogue speech input by a user, the first text information including a first semantic keyword determined from a plurality of candidate terms. The result feedback program module 12 is configured to feed back a first result with the first semantic keyword to the user based on the first text information. The candidate term feedback program module 13 is configured to feed back the plurality of candidate terms to the user in response to the user's selection of the first semantic keyword from the first result. The correction program module 14 is configured to receive a second semantic keyword input by the user, correct the first text information based on the second semantic keyword, determine corrected second text information, and feed back a second result with the second semantic keyword to the user based on the second text information.

Further, the speech recognition program module is configured to:
  select a candidate term with the highest recognition confidence from the plurality of candidate terms and determine the same as the first semantic keyword.

The candidate term feedback program module is configured to:
  rank the plurality of candidate terms by recognition confidence, and feed back a list window of the plurality of candidate terms to the user.

An embodiment of the present invention further provides a non-volatile computer storage medium, which stores computer-executable instructions that can execute the method for correcting a voice dialogue in any of the above method embodiments.

As an embodiment, the non-volatile computer storage medium according to the present invention stores computer-executable instructions, which are set to:
  recognize first text information of a dialogue speech input by a user, the first text information including a first semantic keyword determined from a plurality of candidate terms;
  feed back a first result with the first semantic keyword to the user based on the first text information;
  in response to the user's selection of the first semantic keyword within the first result, feed back the plurality of candidate terms to the user;
  receive a second semantic keyword input by the user, correct the first text information based on the second semantic keyword, determine corrected second text information, and feed back a second result with the second semantic keyword to the user based on the second text information.

As a non-volatile computer-readable storage medium, non-volatile software programs, non-volatile computer-executable programs and modules can be stored therein, such as the program instruction/module corresponding to the method for determining a skill field of a dialogue text in the embodiments of the present invention. One or more program instructions can be stored in the non-volatile computer-readable storage medium, and perform the method for correcting voice dialogue according to any of the above method embodiments when being executed by the processors.

The non-volatile computer storage medium may include a storage program area and a storage data area. The storage program area may store an operating system and application programs required by at least one function. The storage data area may store data generated according to the use of a full-duplex voice dialogue systems and the like. In addition, the memory may include a high-speed random access memory, and may also include a non-volatile memory, such as at least one magnetic disk storage device, a flash memory device, or other non-volatile solid-state storage devices. In some embodiments, the memory may optionally include memories remotely disposed with respect to the processor, and these remote memories may be connected to a full-duplex voice dialogue through a network. Examples of the above network include but are not limited to the Internet, intranet, local area network, mobile communication network, and combinations thereof.

An embodiment of the present invention further provides an electronic device, including: at least one processor, and a memory communicatively connected to the at least one processor. The memory stores instructions executable by the at least one processor. The instructions are executed by the at least one processor to:
  recognize first text information of a dialogue speech input by a user, the first text information including a first semantic keyword determined from a plurality of candidate terms;
  feed back a first result with the first semantic keyword to the user based on the first text information;
  in response to the user's selection of the first semantic keyword within the first result, feed back the plurality of candidate terms to the user;
  receive a second semantic keyword input by the user, correct the first text information based on the second semantic keyword, determine corrected second text information, and feed back a second result with the second semantic keyword to the user based on the second text information.

In some embodiments, the first semantic keyword determined from the plurality of candidate terms comprises:
  selecting a candidate term with the highest recognition confidence from the plurality of candidate terms and determining the same as the first semantic keyword; and
  feeding back the plurality of candidate terms to the user comprises:
  ranking the plurality of candidate terms by recognition confidence, and feeding back a list window of the plurality of candidate terms to the user.

In some embodiments, receiving the second semantic keyword input by the user comprises:
  determining a term selected by the user from the plurality of candidate terms as the second semantic keyword;
  recognizing a corrected dialogue speech input by the user, and determining the second semantic keyword according to the recognition result; and
  determining the second semantic keyword according to a corrected text when it is input by the user.

In some embodiments, the step of receiving the second semantic keyword input by the user further comprises:
  recognizing corrected text in an image information when it is input by the user, and determining the second semantic keyword according to the corrected text.

In some embodiments, the processor is further configured to: record a plurality of rounds of results, each round of result being fed back to the user with semantic keywords; and feed back a plurality of candidate terms corresponding to the semantic keyword to the user in response to the user's selection of a semantic keyword from any round of result.

In some embodiments, feedback of the first result with the first semantic keyword to the user based on the first text information comprises:
  determining a corresponding first skill based on the first text information, and when the first text information hits a plurality of candidate skills, selecting a skill with the highest preset priority and determining the same as the first skill; and
  feeding back the first result with text involving the first skill to the user through the first skill.

In some embodiments, the processor is further configured to: feed back the plurality of candidate skills to the user in response to the user's selection of the text involving the first skill from the first result;

when the user's input comprises a voice dialogue involving a second skill, re-determine the second skill according to the first text information, and feed back the second result with text involving the second skill to the user through the second skill; or when the user's input comprises a negative-tone dialogue involving the first skill, re-determine a corresponding third skill according to the first text information, and feeding back a third result with text involving the third skill to the user through the third skill.

Figure 4:
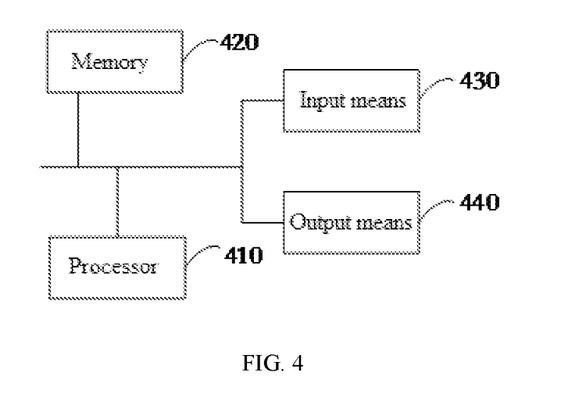
FIG. 4 is a schematic structural diagram of an embodiment of an electronic device according to the present invention.

FIG. 4 is a schematic diagram of a hardware structure of an electronic device for executing a method for correcting a voice dialogue according to another embodiment of the present invention. As shown in FIG. 4, the device includes:

one or more processors 410 and a memory 420, in which one processor 410 is taken as an example in FIG. 4.

The device for performing the method for correcting a voice dialogue may further include an input means 430 and an output means 440.

The processor 410, the memory 420, the input means 430, and the output means 440 may be connected through a bus or in other ways, in which the connection through a bus is taken as an example in FIG. 4.

As a non-volatile computer-readable storage medium, the memory 420 may store non-volatile software programs, non-volatile computer-executable programs and modules, such as the program instruction/module corresponding to the method for correcting a voice dialogue in the embodiments of the present invention. The processor 410 executes various functional applications and data processing of a server by running the non-volatile software programs, instructions and modules stored in the memory 420, that is, to realize the method for correcting a voice dialogue in the above embodiments.

The memory 420 may include a stored program area and a stored data area. The stored program area may store an operating system, an application program required for at least one function. The stored data area may store data created according to the use of the method for correcting a voice dialogue, and the like. Additionally, the memory 420 may include high speed random access memory and non-volatile memory, such as at least one magnetic disk storage device, flash memory device, or other nonvolatile solid state storage device. In some embodiments, the memory 420 may include a memory located remotely relative to the processor 410 and connected to the method for correcting a voice dialogue through a network. Examples of such networks include, but are not limited to, the Internet, an intranet, a local area network, a mobile communication network, and combinations thereof.

The input means 430 may receive input numerical or character information, and generate signals related to user settings and function control of the apparatus for correcting a voice dialogue. The output means 440 may include a display device such as a display screen.

The memory 420 stores one or more modules, which, when being executed by the one or more processors 410, perform the method for correcting a voice dialogue in any of the above method embodiments.

The electronic devices in the embodiments of the present application may be in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with data interaction function.

It should be noted that, wordings like first and second are merely for separating one entity or operation from the other, but not intended to require or imply a relation or sequence among these entities or operations. Further, it should be noted that in this specification, terms such as "comprised of" and "comprising" shall mean that not only those elements described thereafter, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

The embodiments of devices described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

The above embodiments are merely intended to illustrate the technical solutions of the present invention, rather than limiting them. Those skilled in the art may modify the technical solutions described in the above embodiments, or replace some of the technical features therein. These modifications or substitutions do not make the essence of the corresponding technical solutions depart from the spirit and scope of the technical solutions of the embodiments of the present invention.

What is claimed is:

1. A method for correcting a voice dialogue, applied to an electronic device and comprising:

recognizing, by the electronic device, first text information of a dialogue speech input by a user, the first text information comprising a first semantic keyword determined from a plurality of candidate terms;

feeding back, by the electronic device, a first result with the first semantic keyword to the user based on the first text information;

feeding back, by the electronic device, the plurality of candidate terms to the user in response to the user's selection of the first semantic keyword within the first result; and receiving, by the electronic device, a second semantic keyword input by the user, correcting the first text information based on the second semantic keyword, determining corrected second text information, and feeding back a second result with the second semantic keyword to the user based on the second text information, wherein said feeding back the first result with the first semantic keyword to the user based on the first text information comprises:

determining a corresponding first skill based on the first text information, and selecting a skill with the highest preset priority and determining the same as the first skill when the first text information hits a plurality of candidate skills; and feeding back the first result with text involving the first skill to the user through the first skill, and the method further comprises:

feeding back the plurality of candidate skills to the user in response to the user's selection of the text involving the first skill from the first result;

when the user's input comprises a voice dialogue involving a second skill, re-determining the second skill according to the first text information, and feeding back the second result with text involving the second skill to the user through the second skill; or when the user's input comprises a negative-tone dialogue involving the first skill, re-determining a corresponding third skill according to the first text information, and feeding back a third result with text involving the third skill to the user through the third skill.

2. The method according to claim 1, wherein determining the first semantic keyword from the plurality of candidate terms comprises:

selecting a candidate term with the highest recognition confidence from the plurality of candidate terms and determining the same as the first semantic keyword; and said feeding back the plurality of candidate terms to the user comprises:

ranking the plurality of candidate terms by recognition confidence, and feeding back a list window of the plurality of candidate terms to the user.

3. The method according to claim 1, wherein said receiving the second semantic keyword input by the user comprises:

determining a term selected by the user from the plurality of candidate terms as the second semantic keyword;

recognizing a corrected dialogue speech input by the user, and determining the second semantic keyword according to the recognition result; and determining the second semantic keyword according to a corrected text when it is input by the user.

4. The method according to claim 3, wherein said receiving the second semantic keyword input by the user further comprises:

recognizing corrected text in an image information when it is input by the user, and determining the second semantic keyword according to the corrected text.

5. The method according to claim 1, further comprising:

recording a plurality of rounds of results, each round of result being fed back to the user with semantic keywords; and feeding back a plurality of candidate terms corresponding to a semantic keyword to the user in response to the user's selection of the semantic keyword from any round of result.

6. An electronic device comprising: at least one processor, and a memory communicatively coupled to the at least one processor, wherein the memory stores instructions executable by the at least one processor, the instructions being executed by the at least one processor to enable the at least one processor to perform the steps of the method of claim 1.

7. A non-transitory storage medium having a computer program stored therein, wherein the program, when being executed by a processor, implements the steps of the method according to claim 1.

8. A system for correcting a voice dialogue, comprising:

a speech recognition program module configured to recognize first text information of a dialogue speech input by a user, the first text information comprising a first semantic keyword determined from a plurality of candidate terms;

a result feedback program module configured to feed back a first result with the first semantic keyword to the user based on the first text information;

a candidate term feedback program module configured to feed back the plurality of candidate terms to the user in response to the user's selection of the first semantic keyword from the first result;

a correction program module configured to receive a second semantic keyword input by the user, correct the first text information based on the second semantic keyword, determine corrected second text information, and feed back a second result with the second semantic keyword to the user based on the second text information, wherein the result feedback program module is further configured to determining a corresponding first skill based on the first text information, and selecting a skill with the highest preset priority and determining the same as the first skill when the first text information hits a plurality of candidate skills;

feeding back the first result with text involving the first skill to the user through the first skill;

feeding back the plurality of candidate skills to the user in response to the user's selection of the text involving the first skill from the first result;

when the user's input comprises a voice dialogue involving a second skill, re-determining the second skill according to the first text information, and feeding back the second result with text involving the second skill to the user through the second skill; or when the user's input comprises a negative-tone dialogue involving the first skill, re-determining a corresponding third skill according to the first text information, and feeding back a third result with text involving the third skill to the user through the third skill.

* * * * *